United States Patent

Noble et al.

[11] Patent Number: 5,845,128
[45] Date of Patent: Dec. 1, 1998

[54] AUTOMATICALLY PRESERVING APPLICATION CUSTOMIZATIONS DURING INSTALLATION OF A NEW SOFTWARE RELEASE

[75] Inventors: Kenton E. Noble, San Mateo; Richard J. Lotero, Belmont, both of Calif.

[73] Assignee: Oracle Corporation, Redwood Shores, Calif.

[21] Appl. No.: 603,132

[22] Filed: Feb. 20, 1996

[51] Int. Cl.[6] .................................. G06F 9/445
[52] U.S. Cl. ............................ 395/712; 395/651
[58] Field of Search .................... 395/712, 651, 395/652, 653; 707/203; 380/4

[56] References Cited

U.S. PATENT DOCUMENTS 5,666,411  9/1997  McCarty ............................ 380/4
5,668,992  9/1997  Hammer et al. ..................... 395/651

*Primary Examiner*—Emanuel Todd Voeltz
*Assistant Examiner*—Matthew B. Smithers
*Attorney, Agent, or Firm*—Fliesler, Dubb, Meyer & Lovejoy LLP

[57] ABSTRACT

A software release system includes a customization copier and a ship list file. The ship list file enumerates a set of files contained in the new software release and includes a revision indicator, a file size and a checksum for each file in the new software release. The customization copier detects customizations to an old release by analyzing the revision indicators, the file sizes and the checksums.

13 Claims, 5 Drawing Sheets

AUTOMATICALLY PRESERVING APPLICATION CUSTOMIZATIONS DURING INSTALLATION OF A NEW SOFTWARE RELEASE

BACKGROUND OF THE INVENTION

1. Field of Invention

The present invention pertains to the field of computer software. More particularly, this invention relates to preserving customized software applications during installation of a new software release.

2. Art Background

Vendors of software systems commonly market such systems to a wide variety of differing types of business end-users. Such software vendors typically provide software applications and software tools with generic functions that appeal to a variety of business types.

For example, vendors of database systems commonly provide software applications such as database entry forms and database report forms with generic database access functions. Typically, such generic software applications enable end-users to modify the information contained in the database and to create reports from information contained in the database.

However, such generic software applications are usually not tuned to the specific needs of any one particular business end-user. As a consequence, end-users commonly perform customizations to the generic software applications provided by the software vendor. Such customizations commonly involve the modification of files that provide parameters for the generic software applications.

For example, end-users commonly customize the generic software applications that provide database access by modifying files that define the layout and functionality of on-screen database entry forms. Typically, such files are provided with preselected generic parameters during a software release from the software vendor.

Unfortunately, such customizations to released software applications usually hinders the process of installing a new software release. A new software release from the software vendor usually includes new versions of the original software applications including new versions of files that the end-user may have customized. In a typical prior installation process, the new versions of files associated with a new software release replace the older versions including customized files. As a consequence, an end-user must typically reapply the customizations to the files contained in the new software release. Such reapplication of end-user customizations to each new software release consumes excessive time and increases the overall cost of maintaining such a software system.

SUMMARY AND OBJECTS OF THE INVENTION

One object of the present invention is to automatically apply file customizations to new software releases.

Another object of the present invention is to detect incompatibilities between user-customized files and corresponding files in a new software release.

A further object of the present invention is to automatically generate a list of customized files in an old software release.

Another object of the present invention is to provide a virtual representation of a new software release that prevents excessive consumption of mass-storage space during installation of the new release.

These and other objects are provided by a software release system including a customization copier and a ship list file for the new software release. The ship list file enumerates the files contained in the new software release and includes a revision indicator, a file size, and a checksum for each file in the new software release. The ship list file is a virtual representation of a software system for the purposes of determining file versions and customizations. The customization copier detects customizations to an old release by analyzing the revision indicators, file sizes, and checksums and then automatically applying the customizations that remain valid to the new software release.

Other objects, features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which:

FIG. 4 illustrates the information contained in the ship list file of a new software release in one embodiment;

DETAILED DESCRIPTION

Figure 1:
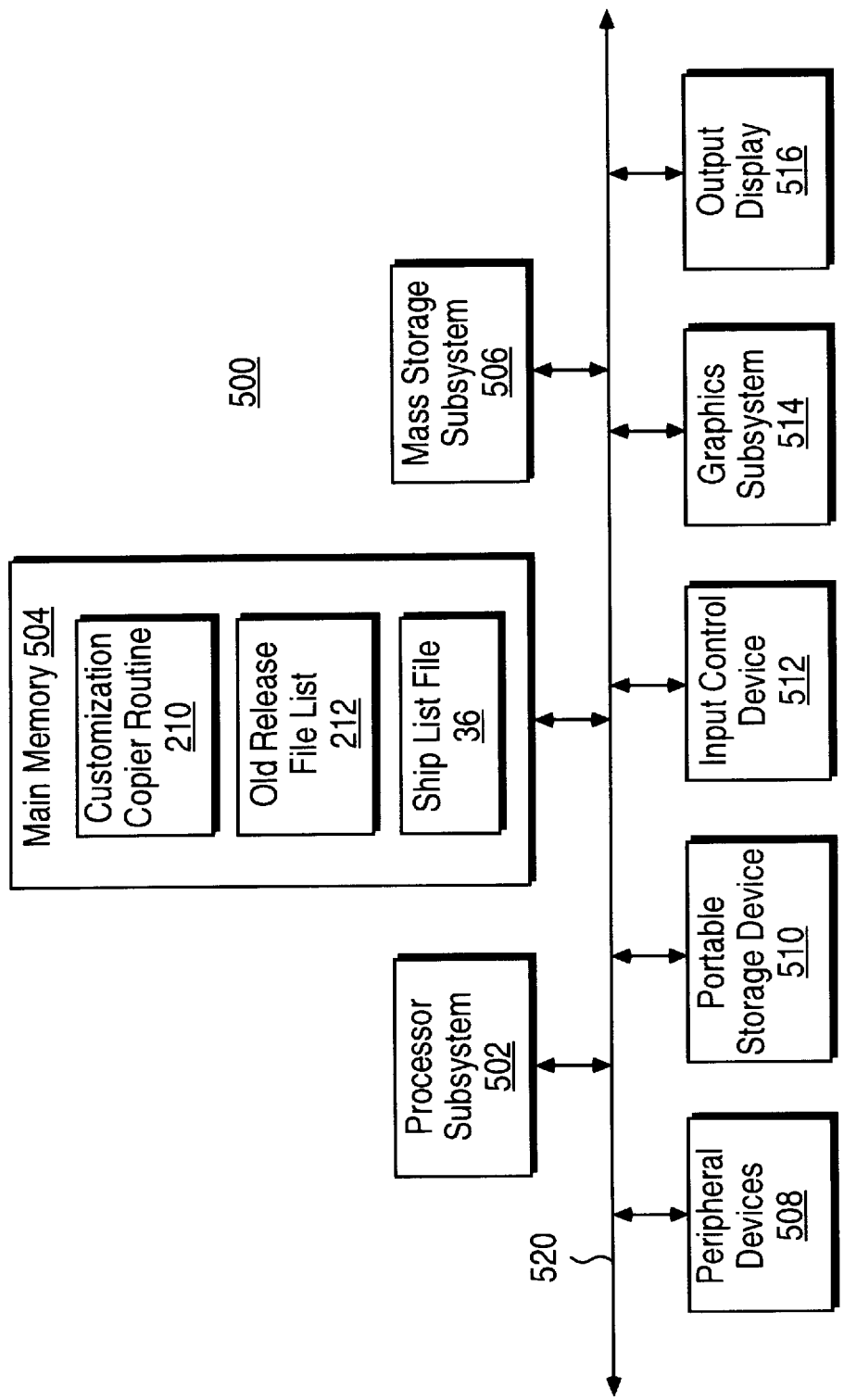
FIG. 1 illustrates a computer system that accommodates a database software system and customization copier for new application software releases.

FIG. 1 illustrates a computer system 500 that accommodates a database system and customization copier for new software releases. The computer system 500 includes a processor subsystem 502, a main memory 504 and an interconnect bus 520. The processor subsystem 502 may include a single microprocessor or central processing unit (CPU) or may include a plurality of microprocessors or CPUs.

The main memory 504 accommodates the storage of instructions and data for execution by the processor subsystem 502. The main memory 504 accommodates a customization copier routine 210, an old release file list 212, and a ship file list 36. The main memory 504 may include dynamic random access memory (DRAM) as well as a cache memory.

The computer system 500 also includes a mass storage subsystem 506, a set of peripheral devices 508, a portable storage device 510, an input control device 512, a graphics subsystem 514 and an output display 516. In one embodiment the various components of the computer system 500 communicate via the interconnect bus 520 which is a local bus. In other embodiments elements of the computer system 500 may be connected via one or more data transport mechanisms. Such transport mechanisms may include, for example, processor buses as well as specialized input/output peripheral buses.

The mass storage subsystem 506, which may be implemented with a magnetic disk drive or an optical disk drive, is a non-volatile storage device for storing data and instructions for use by the processor subsystem 502. In one embodiment, the mass storage subsystem 506 stores the customization copier routine 210 and related system software for loading to the main memory 506.

The portable storage device 510 operates in conjunction with a portable non-volatile storage medium, such as a magnetic tape, a floppy disk or a compact disc read only memory (CD-ROM), to input and output data and code to and from the computer system 500. In one embodiment, the customization copier routine 210 and related system software are stored and distributed on such a portable medium, and are input to the computer system 500 via the portable storage device 510. In addition, files for a new software release along with the ship list file 36 are stored and distributed on such a portable medium.

The peripheral devices 508 may include any type of computer input device, such as an input/output (I/O) interface, to add additional functionality to the computer system 500. For example, the peripheral devices 508 may include a network interface card for interfacing the computer system 500 to a network. The customization copier routine 210 and software releases including the ship list file 36 may be input to the computer system 500 via a portable storage medium or a network.

The input control device 512 provides a portion of the user interface for a user of the computer system 500. The input control device 512 may include an alphanumeric keypad for inputting alphanumeric and other key information, and a cursor control device, such as a mouse, a trackball, stylus, or cursor direction keys.

In order to display textual and graphical information, the computer system 500 contains the graphics subsystem 514 and the output display 516. The output display 516 may include a cathode ray tube (CRT) display or liquid crystal display (LCD). The graphics subsystem 514 receives textual and graphical information, and processes the information for output to the output display 516.

The customization copier software includes a plurality of computer executable instructions for implementation on a general purpose computer system. Prior to loading into a general purpose computer system, the customization copier software may reside as encoded information on a computer readable medium, such as a magnetic floppy disk, magnetic tape, and compact disc read only memory (CD-ROM).

Figure 2:
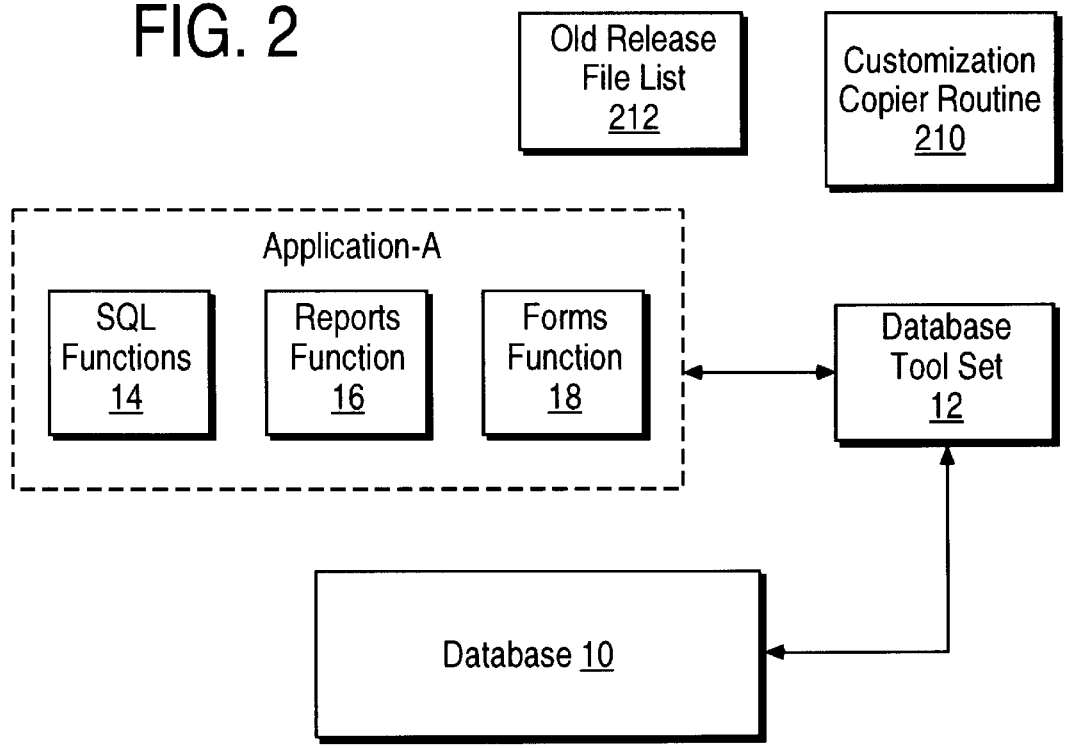
FIG. 2 illustrates the relevant software elements of a database software system including a software application.

FIG. 2 illustrates the relevant software elements of a database system 100 on the computer system 500. The software elements include a database 10 and a database tool set 12. In one embodiment, the database 10 is implemented as a relational database management system (RDBMS). The database tool set 12 includes a variety of routines and functions that enable software applications executing on the computer system 500 to access the information stored in the database 10.

The software vendor that originates the database system 100 includes a variety of generic software applications. In this illustration, one software vendor supplied software application is shown and is referred to as Application-A. There may be many applications which the customization copier 210 processes all in one run.

The Application-A includes a set of structured query language (SQL) functions 14, a reports function 16 and a forms function 18. The SQL functions 14, the reports function 16, and the forms function 18 each invoke services provided by the database tool set 12 to access the database 10. The Application-A includes an SQL file that defines parameters of the SQL function 14. Similarly, the Application-A includes a reports file and a forms file that defines parameters of the reports function 16 and the forms function 18, respectively. Application-A may include other functions.

Also shown is a customization copier routine 210. The customization copier 210 is a system tool for the database system 100 that performs automatic entry of user customizations to software applications during installation of a new software release in the database system 100. The customization copier 210 also catalogs user customizations of previous releases of software applications.

Figure 3:
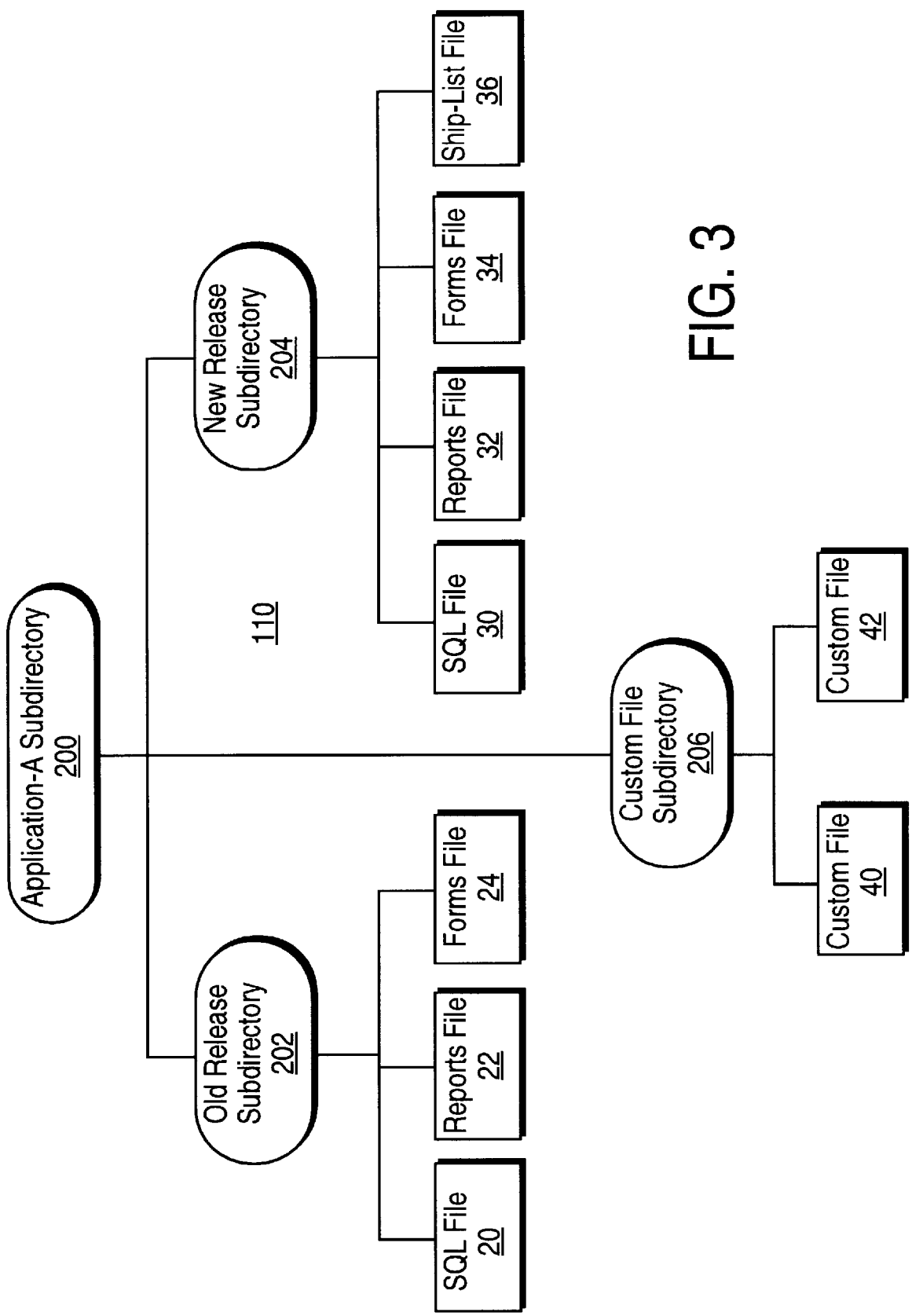
FIG. 3 illustrates a directory structure for a software application including associated files for new and old software releases of the software application.

FIG. 3 illustrates a directory structure 110 for the Application-A. The files associated with the Application-A are contained in an application-A subdirectory 200 which is implemented in the mass storage system 506 of the computer system 500. The application-A subdirectory 200 includes an old release subdirectory 202 and a new release subdirectory 204.

The old release subdirectory 202 includes files for a previous release of files for the database system 100 along with any end-user customizations applied thereto. In this example, the old release subdirectory 202 includes an SQL file 20, a reports file 22 and a forms file 24. The SQL file 20 contains information that defines parameters and functionality of the SQL functions 14 of the Application-A. The reports file 22 contains information that defines the parameters and the functionality of the reports function 16, and the forms file 24 contains similar information for the forms function 18.

The SQL file 20, the reports file 22, and the forms file 24 each contain an embedded file_revision number parameter that is generated by a revision control system of the software vendor. In general, a higher value for a file_revision_ number indicates a later release of the corresponding file.

In one embodiment, the SQL file 20, the reports file 22 and the forms file 24 are each text files. In such an embodiment, an end-user or system administrator or programmer for the database system 100 performs customizations by manipulating the SQL file, the reports file, or the forms file 24 using a text file editor program. In another embodiment, the database tool set 12 includes a set of programs including graphical user interface functions that provide a point-and-click method for modifying the information contained in the SQL file 20, the reports file 22, or the forms file 24. In either case, if any user modifications are entered into the SQL file 20, the reports file 22, or the forms file 24, the resulting files may be referred to as customized files.

The new release subdirectory 204 includes new release versions of the SQL file 20, the reports file 22 and the forms file 24. The SQL file 30 is a new release version of the SQL file 20. The SQL file 30 does not include any user-applied customizations. The reports file 32 and the forms file 34 are new release versions of the reports file 22 and the forms file 24, respectively, without any of the user-applied customizations.

In practice, the old release subdirectory 202 and the new release subdirectory 204 usually include a variety of SQL files, reports files, forms files as well as a variety of other types of files. The SQL file 20, the reports file 22 and the forms file 24 may be viewed as an SQL subdirectory, a reports subdirectory and a forms subdirectory, respectively. Each of the SQL, the reports, and the forms subdirectories may contain multiple SQL files, reports files, and forms files. A similar structure may exist below the new release subdirectory 204.

The new release subdirectory 204 also includes a ship list file 36 which provides a virtual representation of the new release. The virtual representation obviates the need to unload massive amounts of files from a new release when only a subset of the new release files need to be installed at the particular end-user site. The ship list file 36 contains information that facilitates the application of user customizations of the files in the old release subdirectory 202 to the corresponding files in the newly released subdirectory 204.

FIG. 4 illustrates the information contained in the ship list file 36 in one embodiment. The ship list file 36 includes a set of entries referred to as entry 1 through entry n. Each entry 1-n corresponds to a file associated with a new software release, such as a new release of the Application-A in this example. Each entry 1n includes an application identifier and file information that includes a file name, a file_revision_number, a file—size, and a file checksum.

For an example entry shown, the application identifier specifies the Application-A. The file name parameter specifies the SQL file for the Application-A. The file_revision_number provides a revision control number for the SQL file 30 provided with the new release of the Application-A. Similarly, the file—size and the file_checksum parameters provide the file size and file checksum for the SQL file 30 provided with the new release of the Application-A. An example code implementation of the ship list file 36 is provided below.

```
%%% applship file format 10.0.A

# begin tapemaker ship list file

# regular files for product ap

ap    forms   none   APXACEBC.inp   80.16   48217
1177345101
ap    forms   none   APXACEFS.inp   80.18   93244
1753976305
...
ap    srw     none   APGVQPRO.rdf   80.17   135168
1445467916
ap    srw     none   APPAYDIS.rdf   80.14   233472
4145547744
...

# regular files for product gl

gl    forms   none   GLACCSUS.inp   81.10   43251
35005553
gl    forms   none   GLF01110.inp   81.33   137876
2749094158
...
gl    sql     none   GLXRLACF.sql   81.2    5054
964561160
...
gl    srw     none   GLACTANP.rdf   81.18   376832
2050816501
```

Figure 5:
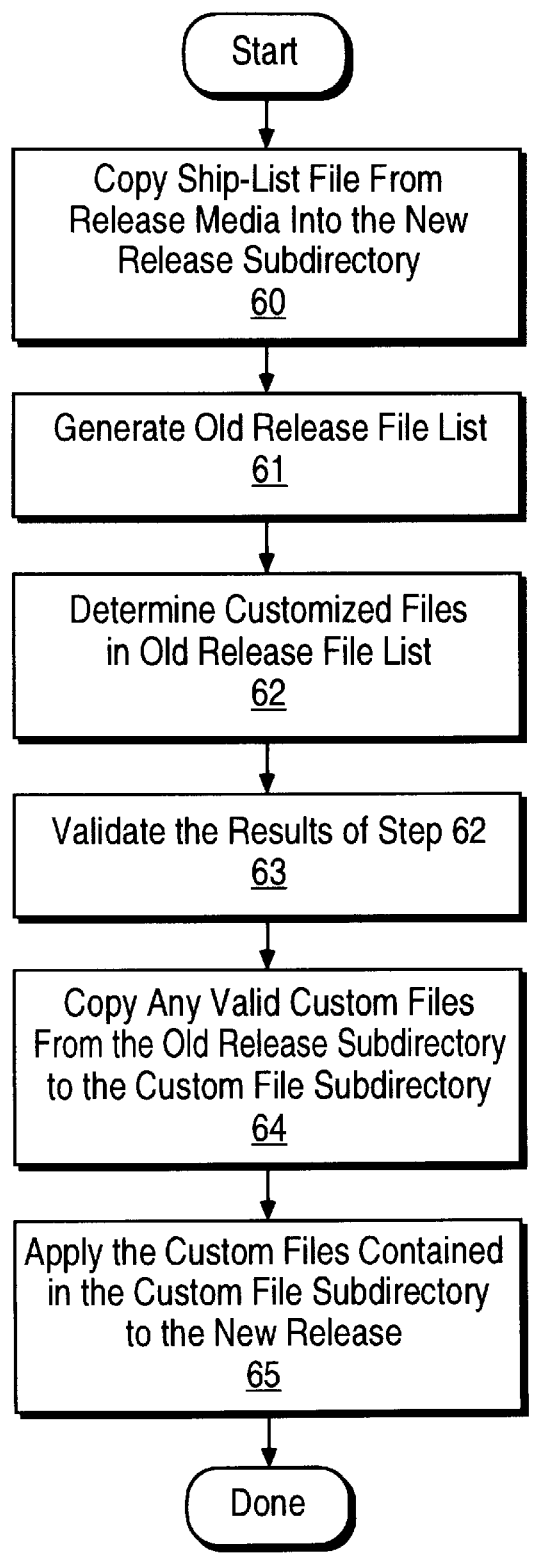
FIG. 5 illustrates a series of process steps for automatically applying user customizations to a new software release.

FIG. 5 illustrates a series of process steps for automatically applying user customizations to a new software release. At process step 60, the ship list file 36 for the new software release is copied from the release media into the new release subdirectory 204. The release media may comprise, for example, compact disk or magnetic tape or floppy disk media for the portable storage device 510. Alternatively, the information contained in the ship list file 36 may be generated at process step 60 by scanning and analyzing the files contained in the new release after copying the new software release from the medium onto a storage device.

At process step 61, the old release file list 212 is generated. In one embodiment, the old release file list 212 is generated by reading a vendor list of installed files. The vendor list of installed files is generated during installation of the old release. In another embodiment, the old release file list 212 is generated by scanning the old release subdirectory 202.

At process step 62, the customization copier routine 210 is executed on the computer system 500. The customization copier routine 210 determines the customized files contained in the old release subdirectory 202. The customization copier routine implements logic for identifying the customized files.

In one embodiment, the user provides a registry of files that lists customized files. In such an embodiment, the registry of files aids the customization copier in determining the valid customized files. The registry of files may, for example, identify new files that were not included as part of the old software release and that may be treated as customized files.

At this point, the files tagged as "do copy" in the old release file list provides a list of customized files that are automatically detected by the customization copier 210. In one embodiment, the customization copier implements an operating mode that merely provides a list of such customized files for examination by the user. The list is displayed or written to a file for examination as a preview for an upcoming new software release.

At process step 63, the user validates the results of process step 62. The files tagged "do copy" may be changed to "do not copy" and files tagged "do not copy" may be changed to "do copy" at process step 63 by the user.

At process step 64, the valid customized files tagged as "do copy" in the old release file list 212 are copied from the old release subdirectory 202 to the custom file subdirectory 206. The valid customized files are shown as a pair of custom files 40 and 42. The customized files 40 and 42 may represent either the SQL file 20 or the reports file 22 or the forms file 24.

After step 64, the files for the new software release, the SQL file 30, the reports file 32, and the forms file 34, are copied from the release media into the new release subdirectory 204. The files contained in the old release subdirectory 202 may be deleted prior to copying the new release onto the new release subdirectory 204 to free up space in the mass storage subsystem 506 to accommodate the new release.

At process step 65, the custom files 40 and 42 in the custom file subdirectory 206 are applied to the new release subdirectory 204. For example, assume that the SQL file 20 is a valid user customized file that is represented by the custom file 40. The SQL file 30 in the new release subdirectory 204 is replaced with the custom file 40, i.e. a copy of the customized SQL file 20. In one embodiment, the SQL file 30 is saved prior to replacement with the custom file 40 so that the SQL file 30 may later be restored to the new release subdirectory 204.

In one embodiment, the user optionally executes a DIFF function on pairs of new and old release files having the same file revision number. The DIFF function performs a binary comparison on the new and old release files and aids in detection of customized files.

Figure 6:
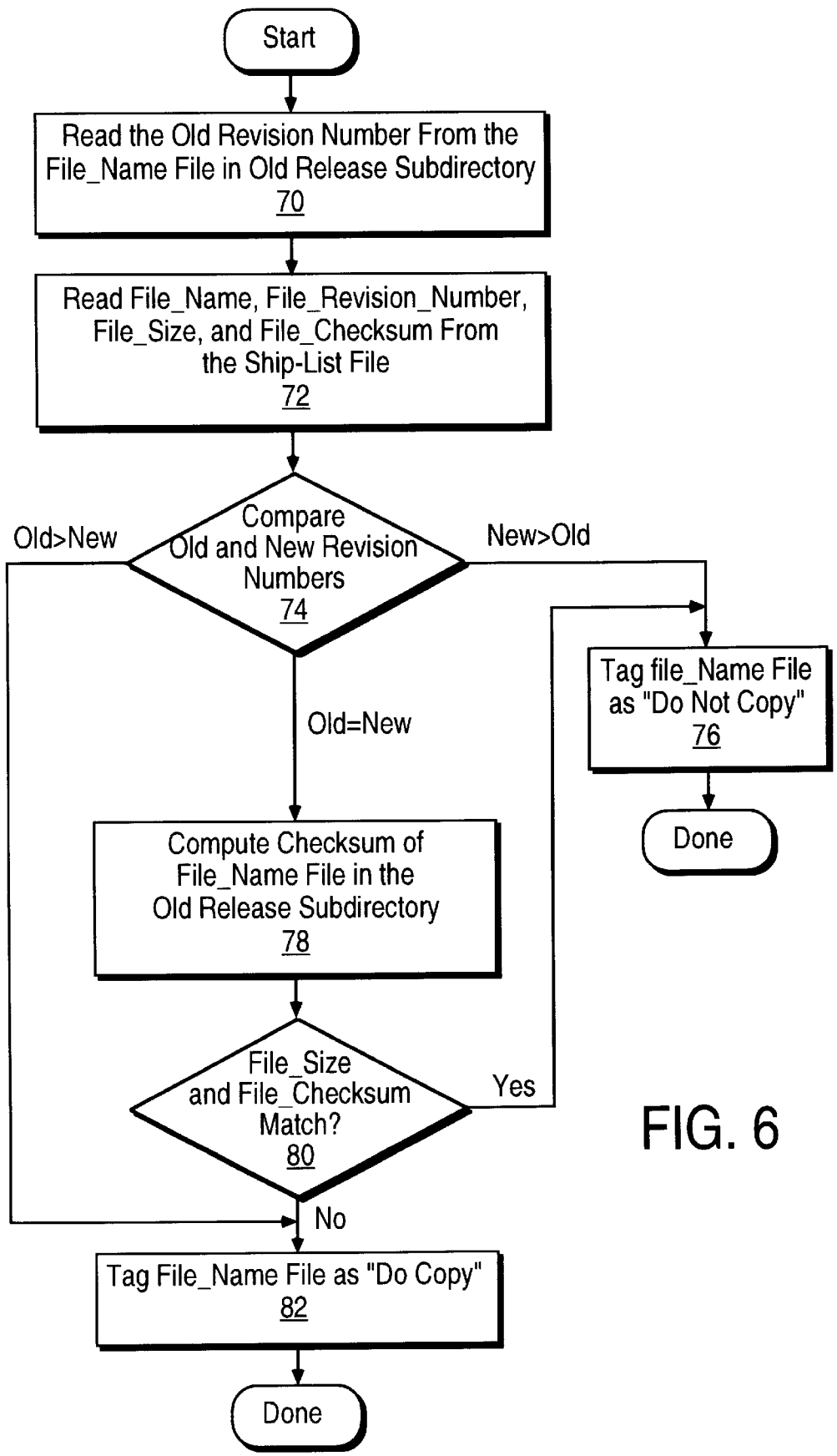
FIG. 6 illustrates the logic implemented in the customization copier for identifying valid user customized files in the old software release.

FIG. 6 illustrates the logic implemented in the customization copier 210 for identifying valid user customized files from the old release subdirectory 202. The customization copier 210 carries out the process steps for each file in the old release file list generated in process step 61.

At step 70, the customization copier 210 extracts the file_revision_number parameter from the file—name file contained in the old release subdirectory 202. The file—revision—number parameters embedded within the files in the old release subdirectory 202 are referred to as old revision numbers.

At step 72, the customization copier 210 reads the file_name, the file_revision_number, the file size, and the file—checksum parameters from an entry of the ship list file 36. The file_revision_number parameters contained in the ship list file 36 are referred to as new revision numbers.

At step 74, the old and new revision numbers are compared. If the new revision number is greater than the old revision number then control proceeds to step 76. At step 76, the customization copier 210 tags the file_name file in the old release file list 212 as "do not copy" which prevents the application of the file_name file to the new release at process step 65. The new version of the file_name file in the new release subdirectory 204 is not replaced regardless of whether the file_name file contained in old release subdirectory 202 has any user customizations. The user is notified at step 76 that any customization applied to the file_name file in the old release subdirectory 202 must be applied to the file_name file in the new release subdirectory 204.

If the old revision number equals the new revision number at step 74, then control proceeds to step 78. At step 78, the customization copier 210 computes a check sum and a file size for the file name file contained in the old release subdirectory 202. Thereafter, at step 80, the customization copier 210 determines whether the file_size and the file_checksum parameters for the file_name file specified in the corresponding entry 1-n of the ship list file 36 matches the file size and file checksum computed at step 78. Alternatively, the comparison at step 80 may only involve either the file size or the file checksum.

If the file_size and/or the file_checksum do not match at step 80, then control proceeds to step 82. The mismatch between the checksum and/or file size parameters at step 82 indicates that a user has applied some sort of customization to the file_name file contained in the old release subdirectory 202. Therefore, at step 82, the customization copier 210 tags the file_name file as "do copy" in the old release file list 212. At process step 65, the file name file in the custom file subdirectory 206 is applied to the new release subdirectory 204 to overwrite the new released version of the file_name file.

If the old revision number is greater than the new revision number at step 74, then control proceeds to step 82 to tag the file_name file as "do copy" which causes application of the file_name file to the new release at process step 65.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A software release system, comprising:
   ship list file that enumerates a set of files contained in a new software release;
   customization copier that detects customizations to an old release of the files and that automatically applies the customizations to the new software release.

2. The software release system of claim 1, wherein the customization copier applies a particular one of the files in the old release to the new software release if a revision number of the particular one of the files in the old release is greater than a revision number of a corresponding file in the new software release.

3. The software release system of claim 1, wherein the customization copier applies a particular one of the files in the old release to the new software release if a revision number of the particular one of the files in the old release equals a revision number of a corresponding file in the new software release and if the particular one of the files and the corresponding file in the new software release are not identical.

4. The software release system of claim 1, wherein the ship list file includes a revision indicator and a checksum for each file in the new software release.

5. The software release system of claim 2, wherein the customization copier detects a customization to the old release of a particular one of the files by comparing the revision indicator and the checksum for the particular one of the files from the old release to a revision indicator and a checksum from the ship list file.

6. The software release system of claim 1, wherein the ship list file includes a revision indicator and a file size for each file in the new software release.

7. The software release system of claim 6, wherein the customization copier detects a customization to the old release of a particular one of the files by comparing the revision indicator and the file size for the particular one of the files from the old release to a revision indicator and a file size from the ship list file.

8. The software release system of claim 1, wherein the ship list file includes a revision indicator, a file size and a checksum for each file in the new software release.

9. The software release system of claim 8, wherein the customization copier detects a customization to the old release of a particular one of the files by comparing the revision indicator and the file size and the checksum for the particular one of the files from the old release to a revision indicator and a file size and a checksum from the ship list file.

10. The software release system of claim 9, wherein the revision indicator of the old release of the particular one of the files is embedded within the old release of the particular one of the files.

11. The software release system of claim 9, wherein the customization copier calculates the checksum and the file size for the old release of the particular one of the files.

12. The software release system of claim 9, wherein the customization copier applies the customization for the particular one of the files to the new software release if the revision indicator for the particular one of the files in the old release matches the corresponding revision indicator in the ship list file and if the checksum and the file size for the old release do not equal the checksum and the file size in the ship list file for the particular one of the files.

13. The software release system of claim 9, wherein the customization copier applies the customization for the particular one of the files to the new software release if the revision indicator for the particular one of the files in the old release is greater than the corresponding revision indicator in the ship list file.

* * * * *